(12) United States Patent
Birckhead et al.

(10) Patent No.: US 6,382,234 B1
(45) Date of Patent: May 7, 2002

(54) ONE SHOT VALVE FOR OPERATING DOWN-HOLE WELL WORKING AND SUB-SEA DEVICES AND TOOLS

(75) Inventors: John Birckhead, Spring; Harry Ehlert, Houston, both of TX (US)

(73) Assignee: Weatherford/Lamb, Inc., Houston, TX (US)

(*) Notice: Subject to any disclaimer, the term of this patent is extended or adjusted under 35 U.S.C. 154(b) by 0 days.

(21) Appl. No.: 08/922,274

(22) Filed: Sep. 3, 1997

Related U.S. Application Data

(60) Provisional application No. 60/027,419, filed on Oct. 8, 1996.

(51) Int. Cl.[7] ................................ F16K 17/40
(52) U.S. Cl. .......................... 137/74; 137/72
(58) Field of Search ................ 137/72, 74, 76

(56) References Cited

U.S. PATENT DOCUMENTS

| | | | | | |
|---|---|---|---|---|---|
| 1,734,186 A | * | 11/1929 | Weidmann et al. | ....... | 137/72 X |
| 2,620,815 A | * | 12/1952 | Margraf et al. | ........... | 137/72 X |
| 2,998,018 A | * | 8/1961 | Beck et al. | .................... | 137/74 |
| 3,618,627 A | * | 11/1971 | Wagner | .................... | 137/72 X |
| 3,638,733 A | * | 2/1972 | De Rouville et al. | ..... | 137/72 X |
| 4,183,371 A | * | 1/1980 | Slawson | ................... | 137/72 X |
| 4,365,643 A | * | 12/1982 | Masclet et al. | ........... | 137/72 X |
| 4,981,260 A | * | 1/1991 | Beiser | ....................... | 137/74 X |
| 5,511,576 A | * | 4/1996 | Borland | ....................... | 137/72 |

FOREIGN PATENT DOCUMENTS

FR           1028619    *   5/1953 ................... 137/72

* cited by examiner

*Primary Examiner*—John Rivell
(74) *Attorney, Agent, or Firm*—Moser, Patterson & Sheridan, L.L.P.

(57) ABSTRACT

This invention relates generally to remotely operated well borehole or sub-sea tools for oilfield use, and more particularly, for a one shot valve useful for activating such well tools or sub-sea devices in a safe and reliable manner.

15 Claims, 1 Drawing Sheet

ONE SHOT VALVE FOR OPERATING DOWN-HOLE WELL WORKING AND SUB-SEA DEVICES AND TOOLS

This application claims benefit of provisional application No. 60/027,419 filed Oct. 8, 1996.

BACKGROUND OF THE INVENTION

1. Field of the Invention

This invention relates generally to remotely operated well borehole or sub-sea tools for oilfield use, and more particularly, for a one shot valve useful for activating such well tools or sub-sea devices in a safe and reliable manner.

2. Background of the Related Art

Well services or completion tools and some sub-sea devices have been designed to operate from hydrostatic pressure. Typically, in operation such tools expose one side of a piston or operating rod to hydrostatic pressure upon receipt of a command with the opposite side of the piston being at atmospheric or a much lower pressure. The pressure differential causes the piston or operating rod to move (do work) and this motion causes the desired tool or device actuation or deployment.

For example, in a well working tool such as a packer, when the tool is run into the borehole on either wireline, coiled tubing or production tubing, an internal piston working in a cylinder with atmospheric pressure maintained upon either end is provided. As the tool is located in a desired position or depth in the borehole, a valve is actuated on command to expose one side of the piston or operating rod to hydrostatic well pressure. This causes a differential pressure force to be applied to the piston which, in turn, causes the piston to move. This force and movement is then mechanically coupled to perform various sub-surface functions as desired, such as setting a packer or setting a wire line locking and pack off device.

There is need for a safe, small, simple and reliable remotely operated electrically actuated valve for use in tools such as these mentioned above.

For these and other reasons, it would be desirable to have a one-shot command activated valve for activating sub-sea or well working tools which is not triggered by random electrical spikes, electrical fields from equipment, or stray ground current on the floor of an offshore platform. The present invention provides such a safe, reliable, one shot activating valve for opening a port in a well tool or sub-sea device to hydrostatic pressure.

In some prior art tools, pyrotechnic or explosive operated valves have been utilized. It is apparent that a differential pressure valve, such as provided in the present invention would provide a much safer device to transport, or use, in a hazardous environment. The lack of pyrotechnic or explosive substances in the operation of the present valve also renders it much less subject to regulation by governmental agencies and transportation services.

BRIEF DESCRIPTION OF THE INVENTION

The present invention comprises a novel one shot electrically activated valve for use in well boreholes or sub-seal tools or devices. The device comprises a normally closed valve configured to open one time and stay open. The valve has an inlet port or ports and outlet port or ports, normally closed, and is insertable into a host device or tool to be pressure activated by opening the inlet and outlet port or ports to communicate hydrostatic pressure to the host tool.

The valve has a body member and shiftable valve means, movable relative to the body member, and having sealing members to initially block fluid passage from the inlet port to the outlet port in the closed position and to allow passage of fluid (pressure) from the inlet port to the outlet port in the open position. The shiftable valve is spring and pressure biased to the open position. Prior to activation, it is held in the closed position by a low temperature meltable retaining pin or plug. Upon command, electrical current is conducted to a heating coil encompassing the retaining plug or pin in order to raise its temperature above its melting point. This then releases the shiftable valve which, assisted by spring and pressure bias, moves to the open position.

The invention may best be understood by reference to the following detailed description thereof, when taken in conjunction with the accompanying drawings.

BRIEF DESCRIPTION OF THE DRAWINGS

The accompanying drawings are intended as illustrative of one preferred embodiment of the present invention. They are intended to be illustrative and not as limitative of the invention.

DESCRIPTION OF THE PREFERRED EMBODIMENT

Figure 1:
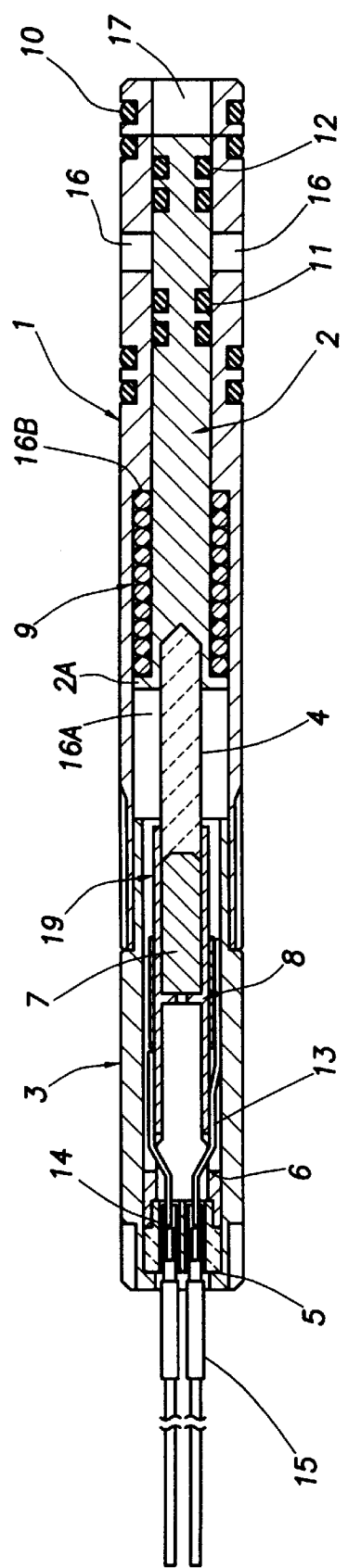
FIG. 1 is a schematic side view in cross section of an actuating valve in accordance with concepts of the invention.
Figure 2:
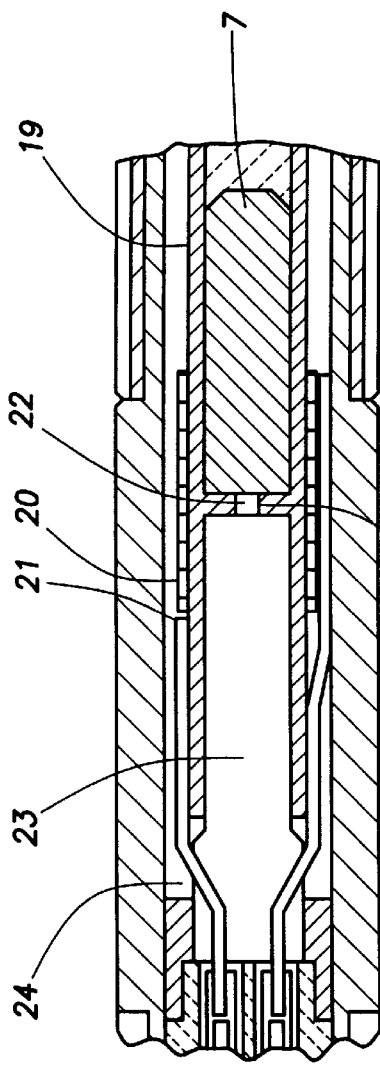
FIG. 2 is an enlarged schematic side view of a portion of the actuating valve of FIG. 1.

Referring initially to FIGS. 1 and 2 jointly, a preferred embodiment of a valve employing concepts of the present invention is shown schematically in a side sectional view. The valve is shown in its normally closed position in FIGS. 1 and 2. It is configured to actuate or open one time and then stay open.

The valve comprises a generally cylindrical shaped body member 1, which is sized and configured (as by external threads, not shown) to be inserted and attached into a host sub-sea or well working tool or device. Body member 1 has external elastomeric O-ring seals 10 disposed in grooves on either side of an inlet port 16, for sealing the bore of the host tool recipient of the valve. Fluid pressure is supplied to the host tool via outlet port 17 when the valve is actuated as will be discussed.

A movable plunger member 2 is sized to be received in and fit into a longitudinal bore 16A in the body member 1. A coil spring 9 captured between a shoulder 16B of plunger 2 in bore 16A and an enlarged diameter head portion 2A of plunger 2, biases plunger 2 to the left (or open) position in the drawing. A thermal insulator member 4 which bears on and is restrained by an electrically activated release mechanism (shown in the circle generally at 8 and enlarged in FIG. 2). The plunger 2 is urged to the open position by two means, a coil spring 9, just discussed, and by a pressure bias means. Both means are provided to assure reliable operation at either low or high hydrostatic (pressure) differentials to overcome O-ring friction. The diameter of plunger O-ring seals 11 are larger than that of plunger O-ring seals 12. This causes a hydrostatic pressure bias (opening force) to be applied to plunger 2 via borehole or sea fluid pressure conducted to plunger 2 by ports 16 which is proportional to the product of the difference in the cross sectional area of the plunger bore 16A at seals 11 and 12 and the differential (hydrostatic) pressure across the seals. O-ring friction normally increases with increasing pressure differential. By sizing seals 11 and 12 properly, an opening force may be provided that is always greater than the plunger O-ring friction regardless of pressure differential.

A cap 3 is threadedly attached (not shown) to the body member 1. The releasing mechanism comprises a meltable or fusible plug or pin member 7 contained inside a heat conducting cylinder 19 of anodized aluminum or the like. A heater coil 20 of turns of resistance wire 21 is wound about the cylinder 19 and connected to electrical power wires 15 which provide electrical current thereto. A partition 22A separates a void space 23 in cylinder 19 from the meltable or fusible plug 7. The heater wide 21 coil straddles the partition 22A in cylinder 19. A hole 22 in the partition 22A provides fluid communication into void space 23 which has its opposite end open. Thus, when the fusible or meltable plug member 7 is rendered liquid, or otherwise pliable, it can flow under the pressure of opening forces described above into void space 23 and into bore 24 inside cap 3 allowing lateral motion of plunger 2 into the "open" position.

The fusible or meltable plug member may comprise a suitable tin/lead alloy or bismuth alloy or antimony alloy chosen to provide mechanical compressive strength, but having a relatively low (500° F. to 1000° F.) melting point and high creep resistance at high temperature, preferably up to its melting point.

In operation, the valve enters the operating environment in the closed position as shown. Seals 10, 11 and 12 prevent fluid passage (and pressure communication) from input port 16 to output port 17. The spring 9 and hydrostatic pressure bias incorporated into plunger 2 operate to bias the plunger left (open position). When it is desired to open the valve, an electrical current is applied via conductors 15 and cause heater coil 20 to heat and to melt the fusible plug 7. Plug 7, now liquefied, is displaced via hole 22 into the heated void space 23 and/or bore 24 allowing the plunger 2 and insulator 4 to move to the left. This in turn opens inlet port 16 to outlet port 17 communicating fluid and hydrostatic pressure to the host tool or device for its operation.

This device provides numerous desirable features such as: Valve actuation may be initiated on command from an electrical source. Short duration electrical spikes or stray ground currents will not accidentally actuate the valve. The valve shifts one time and stays open regardless of additional electrical inputs. The valve has a small size suitable for down hole borehole uses. The configuration operates reliably at temperatures up to 350° F. and pressures up to 15,000 PSI. The valve is safe to handle and to transport. Sealing of ports is positive with no leakage. Required actuation power is low and suitable for battery driven operations. More reliability can be provided than solenoid operated valves due to greater forces being applied by the combination of hydrostatic and spring opening biases provided by the design.

The foregoing descriptions may make other arrangements and embodiments apparent to those of skill in the art. The aim of the appended claims is to cover all such changes and modifications that fall within the true spirit and scope of the invention.

What is claimed:

1. A valve for sub-sea or wellbore use, said valve being a one shot normally closed valve configured to open one time upon activation and stay open, comprising:

a body member having a bore therethrough and having at least one inlet port and at least one outlet port in the bore for communicating fluid pressure from the inlet port to the outlet port, the bore having the inlet port and the outlet port normally closed or sealed apart from each other by a movable plug member;

at least one means for force biasing the movable plug member to an open position in which the inlet port and the outlet port are in fluid communication with each other, a first force biasing means being an effective annular piston area acting upon the moveable plug member;

electrical release means for holding the plug immovable against the at least one force biasing means in the closed position and for releasing the movable plug to move in response to the at least one force biasing means to the open position upon electrical activation thereof.

2. The system of claim 1 wherein said electrical release means comprises a solid meltable pin or plug.

3. The system of claim 2 wherein said meltable pin comprises a metallic pin made of an alloy of tin and lead.

4. The system of claim 3 wherein said alloy has relatively high compressive strength at elevated temperatures.

5. The system of claim 4 wherein said alloy has a melting temperature in the range from about 500 to about 1000° Fahrenheit.

6. The system of claim 5 wherein said electrical release means further comprises a heater coil wound in the vicinity of said meltable pin and space for the material comprising said pin to flow into when rendered liquid by heat.

7. The valve of claim 1, wherein a second force biasing means includes a spring force means.

8. A normally closed one shot valve for wellbore or sub-sea use which is configured to open once and remain open thereafter, comprising:

a body member having a bore therethrough and having inlet and outlet ports and fluid communication with each other via the bore;

a moveable plug in the bore having sealing means for sealing the inlet ports and the outlet ports when in a normally closed position;

at least one means for force biasing the movable plug member to an open position, the force biasing means being a hydrostatic force biasing means comprising two different diameter sealing means on opposite sides of an inlet port acting upon the moveable plug member, and electrically activated release means for holding the movable plug in its normally closed position until the release means is electrically activated; and means for electrically activating the release means to allow motion of the movable plug to its open position.

9. The apparatus of claim 8 wherein said electrically activated release means comprises a fusible or meltable pin positioned to hold said moveable plug normally closed against said means for providing force bias.

10. The apparatus of claim 9 wherein said electrically activated release means further comprises a heater coil wound about said fusible or meltable pin.

11. The apparatus of claim 10 wherein said meltable pin is formed of a relatively low melting temperature metallic alloy.

12. The apparatus of claim 11 wherein said alloy comprises a tin/lead alloy.

13. The apparatus of claim 11 wherein said alloy comprises a bismuth alloy.

14. The apparatus of claim 11 wherein said alloy has a melting point in the range of from about 500 to 1000° Fahrenheit.

15. The valve of claims 8, wherein the at least one force biasing means further includes a spring force means.

* * * * *